March 20, 1956  A. T. SPENCER, JR  2,738,536
WINDSHIELD WIPER
Filed Sept. 23, 1954
FIG_1_
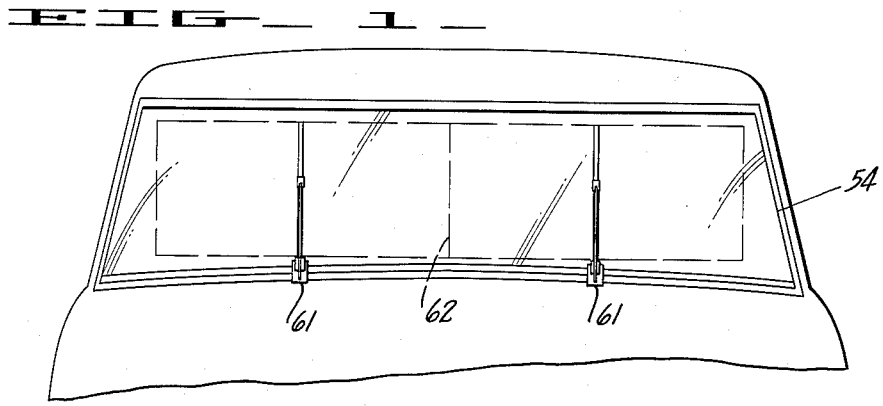
FIG_2_
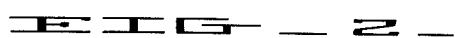
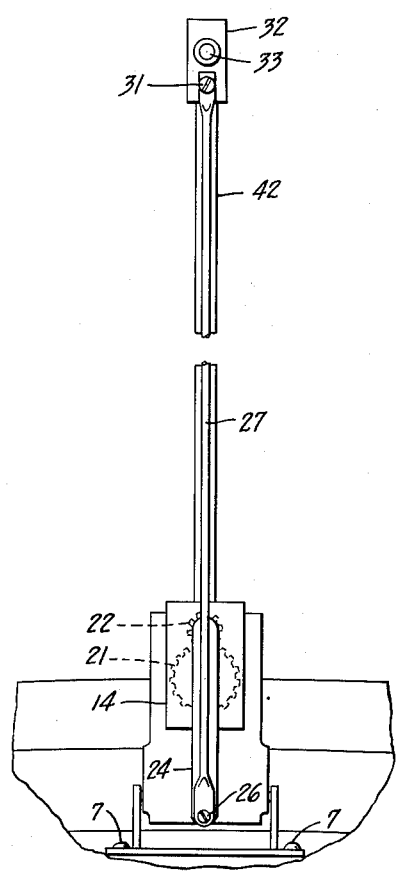
FIG_3_
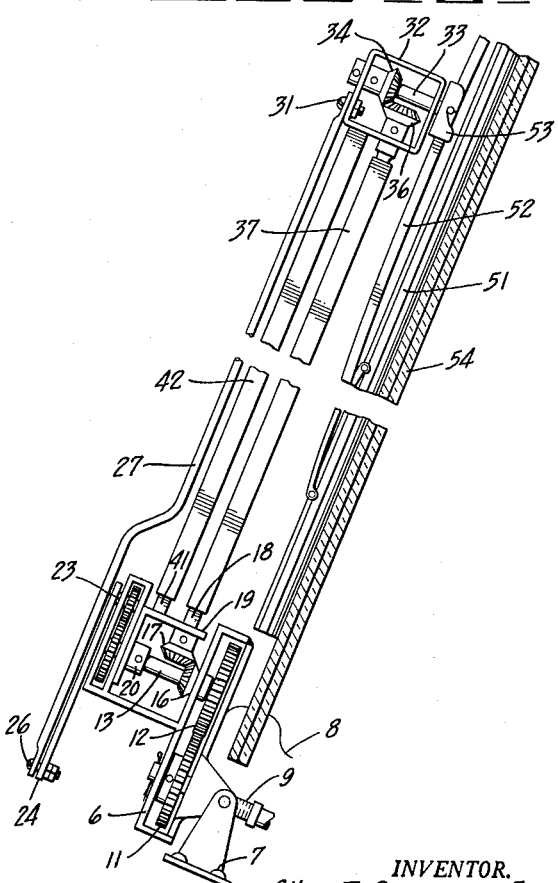
INVENTOR.
Allan T. Spencer, Jr.
ECKHOFF & SLICK, Attys.
BY
A member of the firm.

United States Patent Office 2,738,536
Patented Mar. 20, 1956

2,738,536

WINDSHIELD WIPER

Allan T. Spencer, Jr., Gerber, Calif.

Application September 23, 1954, Serial No. 457,804

2 Claims. (Cl. 15—255)

This invention relates to an improved windshield wiper.

Present windshield wipers include a blade mechanism which is reciprocated in an arcuate path over a relatively small area on a windshield. The usual practice is to use two of such wipers to cover separated areas on the windshield. The result is that one attempting to look through the windshield is confronted with only a limited area of vision, there being numerous "dead" spots or unwiped areas. Except under conditions of good illumination, extremely rare during any period when rain is falling, the vision of the driver is necessarily considerably impaired and restricted.

The present invention is concerned with a mechanism enabling practically the full extent of the windshield to be wiped without leaving any so-called "dead" spot or unwiped areas in the usual field of vision. Further, the wiper of the present invention is suited for use on both plane and arcuate glass surfaces and is particularly suited for use upon the so-called "wrap-around windshield," which is presently so popular. The present invention provides a vertical blade wiping action; a vertical blade will wipe cleaner than in any other position because it sheds the water as it functions.

An object of the present invention is to provide a novel windshield wiper in which the blade always stands in the same vertical angular relation to the windshield, thus facilitating wiping.

The invention includes other objects and features of advantage, some of which, together with the foregoing, will appear hereinafter.

In the drawings, Figure 1 is a fragmentary front view of a vehicle cab showing a pair of windshield wipers of this invention mounted thereon.

Figure 2 is a vertical dead-center plan view of a windshield wiping mechanism embodying the present invention, while Figure 3 is a side elevation, partly in section, of this same mechanism.

Referring to the drawings, the device includes a suitable housing, generally indicated at 6, adapted to be mounted as by screws 7 upon a suitable supporting portion of a vehicle such as dash 8, providing the windshield surface to be wiped is substantially a flat surface. If, however, the windshield surface is either concave or convex, instead of a rigid connection by screws 7, a transverse, spring-loaded hinge is substituted, the base of which is attached to the cowl by screws, but the hinge connection to housing 6 allows the entire wiper mechanism to adjust, within reasonable limits, to the surface of the glass and to maintain relatively consistent tension on the wiper blade so that it will function effectively.

In addition to the hinge arrangement, a suitable flexible coupling is provided between motor drive shaft and driven shaft 9. Since this shaft only oscillates approximately 110° and the driver and driven units are on a common center with the hinge pivot points, a simple sleeve connection will suffice to transmit power. Drive shaft 9 projects into housing 6 from a suitable driving motor (not shown) of a type and form well known in the art and which serves to oscillate shaft 9. A first spur gear 11 secured upon the end of drive shaft 9 in mesh with a second spur gear 12 (spur gears 11 and 12 are used only to provide an offset-type drive where clearance for arm 24 is required; otherwise, motor oscillating drive shaft can be connected directly to shaft 13), this being secured upon one end of countershaft 13; countershaft 13 is supported for rotation by the housing 6 and by supporting bracket 14 mounted upon the housing. Countershaft 13 includes a first miter gear 16 which is stationary and attached to housing 6 and which is enmeshed with a second miter gear 17, the latter being mounted upon one end of a generally vertically extending square shaft 18. The shaft 18 is supported for rotation in a bracket 19, the latter being secured to a collar 20 which is, in turn, secured to shaft 13 and oscillates with that shaft.

The other end of countershaft 13 carries a spur gear 21 thereon, this being in mesh with a second but smaller spur gear 22 (relationship is a 2-to-1 ratio) mounted upon a shaft 23 supported in the bracket 14. One end of an arm 24 is affixed to the shaft 23, while the other end of arm 24 is pivotally connected by bolt 26 to a link 27, the latter rising vertically and being secured as by bolt 31 to a supporting frame 32. Mounted within the frame 32 is a shaft 33 extending transversely of the housing and having a third miter gear 34 thereon (Note: All miter gears are of same pitch and 1-to-1 ratio). A fourth miter gear 36 is enmeshed with miter gear 34, miter gear 36 being mounted upon the upper end of a square tubular member 37, which is slidable on and rotated by member 18. Also secured to the bracket extension 19 is a member 41 having a sliding but non-rotative fit with a tubular member 42, the upper end of which is secured to support frame 32.

In operation, shaft 9 is oscillated in the usual manner, this resulting in the regular and controlled oscillation of shaft 13, bracket 19 secured thereto, and through gears 21 and 22, shaft 23, arm 24 and link 27, with the result that the framework 32 at the upper end of tubular members 37 and 42 is moved over substantially a straight line path, the limits of which are determined by the arc through which shaft 9 is turned and by the throw of link 24.

To ensure that windshield wiper blade 50 affixed to shaft 33 always engages the windshield in a vertical position, means have been provided in the form of the gear drive through gears 16, 17, 34 and 36 to rotate shaft 33 such an amount during the oscillation of framework 32 that the wiper blade always stands in a vertical position and so wipes a rectangular area, as has been indicated diagrammatically in Figure 1.

In Figure 3, windshield wiper blade 51 is shown as including the usual spring bow 52 and attaching means 53, these being well known in the art for supporting the wiper blade 51 in a tensioned position with respect to the windshield glass surface 54.

Referring to Figure 1, I have indicated two assemblies 61 embodying the present invention positioned in wiping relation to the windshield 54. It is preferred to operate the motors associated with each of the wiper assemblies so that the blades 51 move simultaneously at the same rate and in the same direction and so are spaced apart an equal distance at all times. The path of travel of the blades is such that they have a common meeting point with even a slight area of overlap at the midpoint of the windshield, indicated at 62. In this way, the windshield can be wiped from one side to the other without leaving any blind spots in the driver's vision. The wipers can, of course, be so operated by suitable energization of their respective motors that the blades first approach each other and then move apart.

From the foregoing, I believe it will be apparent that I have provided a novel, simple and improved windshield wiper mechanism, particularly one suited to use upon arcuate glass surfaces.

I claim:

1. A windshield wiper of the class described comprising an oscillating shaft mounted in a first housing, a bracket carried by said shaft and rotated thereby, a first gear on said shaft and a second gear meshed therewith and carried by a second shaft rotatable within said first housing, the ratio of the first gear to the second gear being 2:1, a crank arm on the second gear shaft, a second housing having a wiper arm shaft rotatable therein, said shaft carrying a wiper blade, said second housing being connected to the bracket by a slidable connection, a link connecting said crank arm and said second housing, and means connecting said oscillating shaft and said wiper arm shaft whereby the wiper blade on said wiper arm shaft remains vertical as the second housing oscillates.

2. The device of claim 1 wherein the means for maintaining the wiper vertical comprises a first fixed bevel gear carried by the first housing and enmeshed with a second bevel gear mounted on one end of an extendable shaft connecting the bracket and the second housing, a third bevel gear mounted on the opposite end of said shaft and meshed with a fourth bevel gear carried by the wiper arm shaft, the ratio of the first to the fourth bevel gears being 1:1.

References Cited in the file of this patent

UNITED STATES PATENTS

| | | |
|---|---|---|
| 1,660,971 | Lindler | Feb. 28, 1928 |
| 1,964,109 | Cusset | June 26, 1934 |
| 2,624,904 | Wianco | Jan. 13, 1953 |